United States Patent
Sano et al.

(10) Patent No.: US 8,554,446 B2
(45) Date of Patent: Oct. 8, 2013

(54) CONTROL APPARATUS FOR INTERNAL COMBUSTION ENGINE INCLUDING VARIABLE VALVE OPERATING MECHANISM

(75) Inventors: Keisuke Sano, Susono (JP); Kazuhiro Wakao, Susono (JP); Takashi Nishikiori, Susono (JP); Takashi Watanabe, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 266 days.

(21) Appl. No.: 13/203,793

(22) PCT Filed: Apr. 15, 2009

(86) PCT No.: PCT/JP2009/057583
§ 371 (c)(1),
(2), (4) Date: Aug. 29, 2011

(87) PCT Pub. No.: WO2010/119524
PCT Pub. Date: Oct. 21, 2010

(65) Prior Publication Data
US 2011/0313642 A1 Dec. 22, 2011

(51) Int. Cl.
G06F 19/00 (2011.01)
F02D 28/00 (2006.01)
F02D 41/14 (2006.01)
F02M 25/06 (2006.01)
F02M 25/08 (2006.01)
F02M 51/00 (2006.01)
F01L 1/34 (2006.01)

(52) U.S. Cl.
USPC .............. 701/104; 123/198 DB; 123/572; 123/698; 123/703; 123/704; 701/103; 701/109; 701/114

(58) Field of Classification Search
USPC ............ 701/102–104, 108, 109, 112, 114, 701/115; 123/41.86, 90.1, 90.11, 90.12, 123/90.15–90.18, 90.23, 90.24, 90.28, 198 DB, 123/198 DC, 198 CP, 198 F, 299–305, 123/325, 326, 481, 520, 572–574, 679, 688, 123/690, 698, 703, 704
See application file for complete search history.

(56) References Cited

U.S. PATENT DOCUMENTS 6,227,184 B1 * 5/2001 Katayama et al. ............ 123/572
2002/0040706 A1 * 4/2002 Katayama et al. ............ 123/516
(Continued)

FOREIGN PATENT DOCUMENTS

JP 07 305646 11/1995
JP 2005-16308 A 1/2005
(Continued)

OTHER PUBLICATIONS

Japanese Office Action issued Sep. 18, 2012 in Patent Application No. 2011-509124.
(Continued)

Primary Examiner — Willis R Wolfe, Jr.
Assistant Examiner — Johnny Hoang
(74) Attorney, Agent, or Firm — Oblon, Spivak, McClelland, Maier & Neustadt, L.L.P.

(57) ABSTRACT

Provided is a control apparatus, which can successfully suppress that deterioration of combustion is caused in response to inflow of a large amount of blow-by gas to cylinders at the time of a valve return from a valve stop state in an internal combustion engine including a positive crankcase ventilation system and a variable valve operating mechanism that is capable of stopping at least one valve of an intake valve and exhaust valve in a closed state. A valve stop control is performed which stops the intake valve and exhaust valve in a closed state when a fuel cut of the internal combustion engine is executed. A deviation amount ΔA/F between a predetermined target air fuel ratio and an actual air fuel ratio detected by an A/F sensor at the time of a valve return is obtained. A correction is performed to decrease a fuel injection amount by a fuel amount equivalent to the deviation amount ΔA/F at the time of the subsequent valve returns.

8 Claims, 4 Drawing Sheets

(56) References Cited

U.S. PATENT DOCUMENTS

| | | | |
|---|---|---|---|
| 2003/0000504 A1* | 1/2003 | Katayama et al. | 123/516 |
| 2006/0150951 A1* | 7/2006 | Basaki et al. | 123/431 |
| 2008/0011264 A1* | 1/2008 | Kawamura et al. | 123/196 R |
| 2008/0040018 A1* | 2/2008 | Katoch | 701/103 |
| 2009/0241921 A1* | 10/2009 | Ito et al. | 123/573 |

FOREIGN PATENT DOCUMENTS

| | | |
|---|---|---|
| JP | 2005 61420 | 3/2005 |
| JP | 2006 250080 | 9/2006 |
| JP | 2007 162506 | 6/2007 |
| JP | 2007 231750 | 9/2007 |
| JP | 2007 270772 | 10/2007 |
| JP | 2007 321743 | 12/2007 |
| JP | 2008 267189 | 11/2008 |
| JP | 2009-62940 A | 3/2009 |

OTHER PUBLICATIONS

International Search Report issued May 26, 2009 in PCT/JP09/057583 filed Apr. 15, 2009.

* cited by examiner

| Learned-value-stored map | Engine water temperature(°C) | | |
|---|---|---|---|
| | 60-80 | 81-90 | 91- |
| Valve stop time (s) 2-5 | | | |
| 5-10 | | | |
| 10- | | | |

Store deviation amount ΔA/F of air fuel ratio into frame corresponding to valve stop time and engine water temperature at obtaining ΔA/F

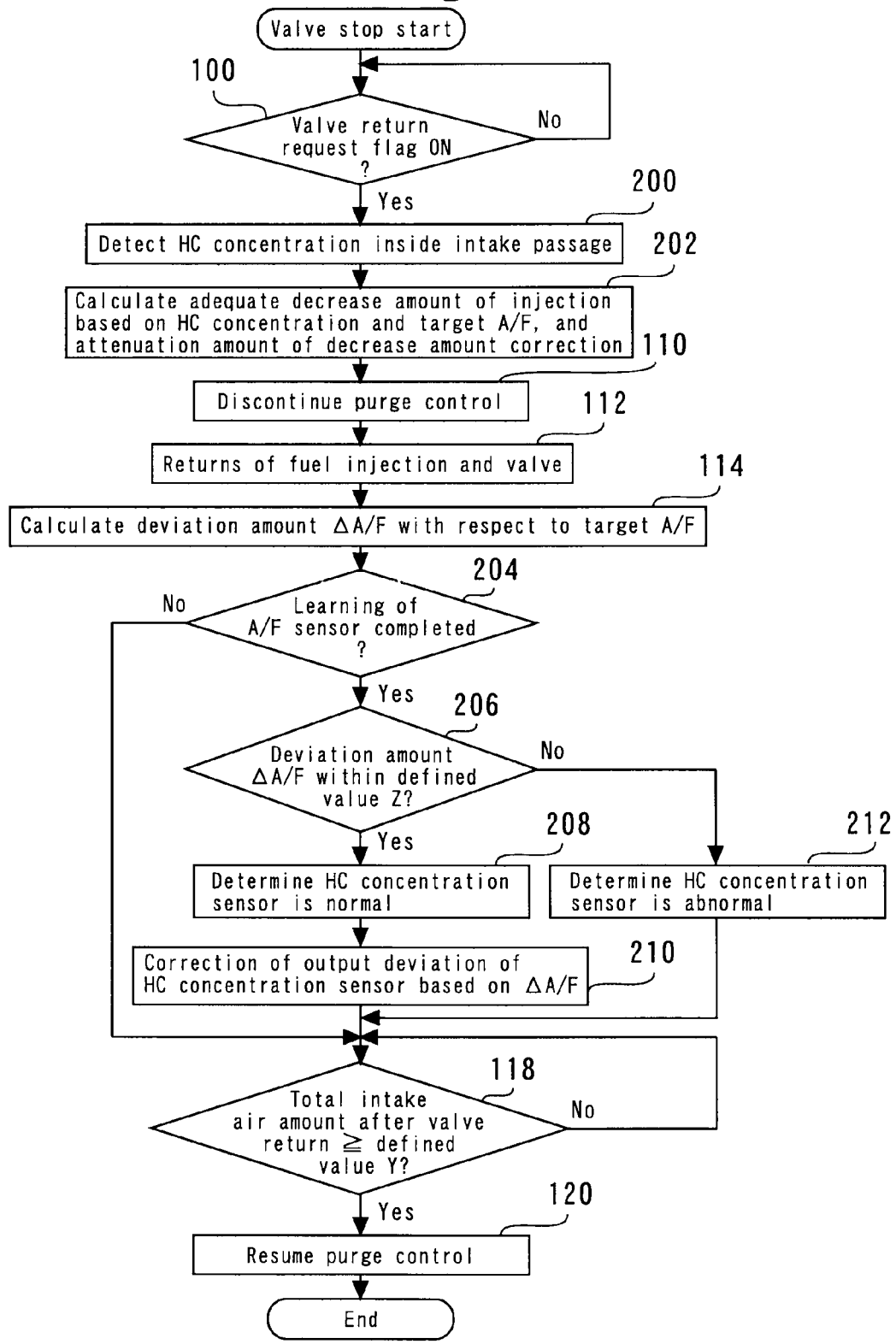

CONTROL APPARATUS FOR INTERNAL COMBUSTION ENGINE INCLUDING VARIABLE VALVE OPERATING MECHANISM

TECHNICAL FIELD

The present invention relates to a control apparatus for an internal combustion engine including a variable valve operating mechanism.

BACKGROUND ART

So far, for example, Patent Document 1 discloses a control apparatus for an internal combustion engine including a variable valve operating mechanism which can stop intake valves in a closed state. The conventional control apparatus stops the intake valve in the closed state to prevent fresh air from being introduced into a catalyst when a fuel cut is executed at the time of deceleration, thereby attempting to inhibit the catalyst from being deteriorated.

In addition, for example, Patent Document 2 discloses an internal combustion engine including a positive crankcase ventilation system which circulates blow-by gas in the inside of the engine back to intake air to treat it. FIG. 1 of Patent Document 2 represents a configuration which is provided with a blow-by gas passage, a fresh air introduction passage, a breather passage and a PCV valve by way of example of such a positive crankcase ventilation system.

More specifically, the blow-by gas passage, which allows a crankcase to be communicated with the inside of a head cover, is provided to lead gas that is blown from the combustion chamber side to the crankcase side via a gap between a cylinder and a piston (that is, blow-by gas), into the inside of the head cover. The fresh air introduction passage, which allows an intake passage at the upstream side of a throttle valve to be communicated with the inside of the head cover, is provided to introduce fresh air into the inside of the head cover. The breather passage, which allows the intake passage at the downstream side of the throttle valve to be communicated with the inside of the head cover, is provided to supply the blow-by gas in the inside of the head cover into intake air flowing through the intake passage. Moreover, the PCV valve is a valve for adjusting a flow rate of the blow-by gas circulated back into the intake air via the breather passage.

Including the above-described document, the applicant is aware of the following documents as a related art of the present invention.
[Patent Document 1] Japanese Laid-open Patent Application Publication No. 2007-162506
[Patent Document 2] Japanese Laid-open Patent Application Publication No. 2006-250080
[Patent Document 3] Japanese Laid-open Patent Application Publication No. 7-305646
[Patent Document 4] Japanese Laid-open Patent Application Publication No. 2008-267189

DISCLOSURE OF INVENTION

Problem to be Solved by the Invention

Meanwhile, if the operation of at least one valve of an intake valve and an exhaust valve is stopped in a closed state during a fuel cut at the time of deceleration or the like, an intake air negative pressure at the downstream side of the throttle valve disappears. As a result of this, the differential pressure between the upstream side and downstream side of the throttle valve in the intake passage becomes gradually smaller. Into the fresh air introduction passage of the positive crankcase ventilation system described above, fresh air is introduced using the differential pressure. Because of this, when the differential pressure becomes small, the amount of the fresh air supplied to the inside of the head cover becomes smaller and the blow-by gas comes to be accumulated inside the head cover without being suctioned into cylinders. Consequently, the blow-by gas eventually flows back to the upstream side of the throttle valve from the fresh air introduction passage. If a large quantity of the blow-by gas flowing out to the intake passage through the fresh air introduction passage in this way flows into the cylinders at the time of a return from the fuel cut, a variation in air fuel ratio and a deterioration of combustion associated with it are caused.

The present invention has been made to solve the problem as described above, and has its object to provide a control apparatus, which can successfully suppress that deterioration of combustion is caused in response to inflow of a large amount of blow-by gas to cylinders at the time of a valve return from a valve stop state in an internal combustion engine including a positive crankcase ventilation system and a variable valve operating mechanism that is capable of stopping at least one valve of an intake valve and exhaust valve in a closed state.

Means for Solving the Problem

A first aspect of the present invention is a control apparatus for an internal combustion engine including a variable valve operating mechanism, the control apparatus comprising:
a positive crankcase ventilation system which circulates blow-by gas inside the internal combustion engine back into intake air to treat the blow-by gas;
a variable valve operating mechanism which is capable of stopping operation of at least one valve of an intake valve and an exhaust valve in a closed state;
valve stop execution means which stops the at least one valve in the closed state when a fuel cut of the internal combustion engine is executed;
HC concentration estimation means which estimates an HC concentration of gas inside an intake passage at the time of a valve return when the at least one valve returns to a operable state from a stop state; and
injection amount determination means which determines a fuel injection amount at the time of the valve return based on the HC concentration estimated by the HC concentration estimation means.

A second aspect of the present invention is the control apparatus for an internal combustion engine including a variable valve operating mechanism according to the first aspect of the present invention,
wherein the control apparatus for the internal combustion engine further comprises an air fuel ratio sensor which detects an air fuel ratio of exhaust gas flowing through an exhaust passage, and
wherein the HC concentration estimation means estimates the HC concentration of gas inside the intake passage at the time of the valve return, based on a deviation between a predetermined target air fuel ratio and an actual air fuel ratio detected by the air fuel ratio sensor at the time of the valve return.

A third aspect of the present invention is the control apparatus for an internal combustion engine including a variable valve operating mechanism according to the first aspect of the present invention,
wherein the HC concentration estimation means includes HC concentration detection means which is disposed at the intake passage, and
wherein the HC concentration estimation means estimates the HC concentration of gas inside the intake passage at the time of the valve return using a value detected by the HC concentration detection means.

A fourth aspect of the present invention is the control apparatus for an internal combustion engine including a variable valve operating mechanism according to the third aspect of the present invention, wherein the control apparatus for the internal combustion engine further comprises:

an air fuel ratio sensor which detects an air fuel ratio of exhaust gas flowing through an exhaust passage; and sensor abnormality determination means which determines that the HC concentration detection means is abnormal when a deviation between a predetermined target air fuel ratio and an actual air fuel ratio detected by the air fuel ratio sensor at the time of the valve return is equal to or larger than a predetermined value.

A fifth aspect of the present invention is the control apparatus for an internal combustion engine including a variable valve operating mechanism according to any one of the first to fourth aspects of the present invention, wherein the injection amount determination means includes HC concentration storage means which stores, in association with a valve stop time or a total engine speed during the valve stop, the HC concentration estimated by the HC concentration estimation means, and wherein the injection amount determination means determines the fuel injection amount at the time of the valve stop based on the HC concentration stored by the HC concentration storage means.

A sixth aspect of the present invention is the control apparatus for an internal combustion engine including a variable valve operating mechanism according to the fifth aspect of the present invention, wherein the internal combustion engine further comprises an evaporative fuel treatment apparatus which causes a canister to adsorb evaporative fuel from a fuel system and allows the evaporative fuel adsorbed by the canister to be purged into the intake passage via a purge passage having a flow rate control valve, and wherein the control apparatus for the internal combustion engine further comprises purge control prohibition means which prohibits a supply of purge gas into the intake passage by the evaporative fuel treatment apparatus when a fuel injection amount control is executed by the injection amount determination means based on the HC concentration in the intake passage.

A seventh aspect of the present invention is the control apparatus for an internal combustion engine including a variable valve operating mechanism according to any one of the first to sixth aspects of the present invention, wherein the internal combustion engine further comprises an evaporative fuel adsorbent which adsorbs evaporative fuel at the intake passage at an upstream side of a connecting portion to the intake passage in a fresh air introduction passage that is included in the positive crankcase ventilation system, and wherein the control apparatus for the internal combustion engine further comprises valve stop time determination means which determines a valve stop time in accordance with an adsorption amount of the evaporative fuel onto the evaporative fuel adsorbent.

Advantages of the Invention

The first aspect of the present invention makes it possible to adequately determine the fuel injection amount at the time of the valve return, while taking into consideration effects of the blow-by gas remaining inside the intake passage during the valve stop. Because of this, it is possible to successfully suppress the deterioration of combustion due to the blow-by gas at the time of the return.

The deviation between the predetermined target air fuel ratio and the actual air fuel ratio detected by the air fuel ratio sensor at the time of the valve return increases as the amount of the blow-by gas remaining inside the intake passage during the valve stop increases. Because of this, according to the second aspect of the present invention, by obtaining the deviation at the time of the return, it becomes possible to successfully estimate the concentration of the blow-by gas (that is, the HC concentration) within the intake passage at the time of the valve return using the air fuel ratio sensor installed in the exhaust passage originally.

The third aspect of the present invention makes it possible to directly estimate the concentration of the blow-by gas (that is, the HC concentration) within the intake passage at the time of the valve return because the HC concentration detection means is provided at the intake passage.

The fourth aspect of the present invention makes it possible to perform the abnormality determination for the HC concentration detection means through the use of the air fuel ratio sensor disposed at the exhaust passage without adding a new sensor and the like separately.

According to the fifth aspect of the present invention, the HC concentration inside the intake passage estimated by the HC concentration estimation means is stored in association with the valve stop time or the total engine speed during the valve stop. The amount of the blow-by gas flowing out the intake passage during the valve stop varies with the valve stop time or the total engine speed. Thus, by storing and learning the HC concentration associated with the valve stop time or the like, the fuel injection amount required for immediately achieving a desired air fuel ratio at the time of the subsequent valve returns can be determined more accurately in accordance with the valve stop time or the like of the moment.

The sixth aspect of the present invention makes it possible to prevent an incorrect learned value of the HC concentration from being stored and learned due to the purge gas containing the evaporative fuel from the evaporative fuel treatment apparatus.

The seventh aspect of the present invention makes it possible to prevent the blow-by gas being accumulated in the intake passage during the valve stop from being released to the atmosphere from the entrance side of the intake passage.

BRIEF DESCRIPTION OF DRAWINGS

FIG. 4 is a flowchart illustrating a routine that is executed according to the second embodiment of the present invention.

DESCRIPTION OF SYMBOLS

Figure 1:
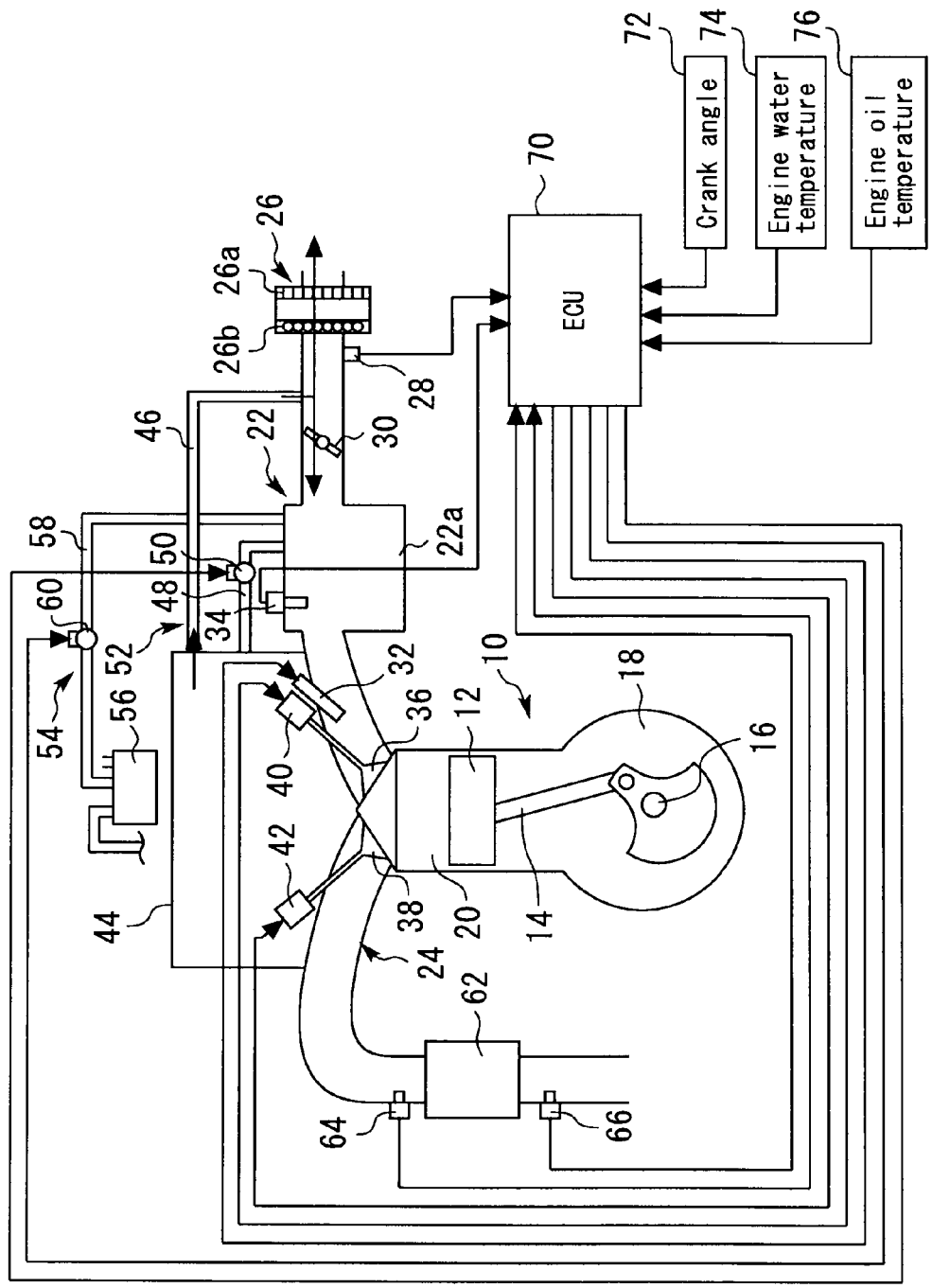
FIG. 1 is a diagram for explaining the configuration of an internal combustion engine system according to a first embodiment of the present invention.

10 internal combustion engine
16 crankshaft
18 crankcase
20 combustion chamber
22 intake passage 22a intake manifold
24 exhaust passage
26 air cleaner
26a air filter
26b evaporative fuel adsorbent
30 throttle valve
32 fuel injection valve
34 HC concentration sensor
36 intake valve
38 exhaust valve
40 intake variable valve operating mechanism
42 exhaust variable valve operating mechanism
44 head cover
46 fresh air introduction passage
48 breather passage
50 PCV valve
52 positive crankcase ventilation system
54 evaporative fuel treatment apparatus
56 canister
58 purge passage
60 flow rate control valve (VSV)
62 catalyst
64 A/F sensor
70 ECU (Electronic Control Unit)

BEST MODE FOR CARRYING OUT THE INVENTION

First Embodiment
[Description of System Configuration]

FIG. 1 is a diagram for explaining the configuration of an internal combustion engine system according to a first embodiment of the present invention. The system of the present embodiment includes an internal combustion engine 10. Each of cylinders of the internal combustion engine 10 contains a piston 12. The piston 12 is coupled with a crankshaft 16 via a connecting rod 14. The crankshaft 16 is installed in a crankcase 18. Each of the cylinders of the internal combustion engine 10 also has a combustion chamber 20 formed atop the piston 12. An intake passage 22 and an exhaust passage 24 are communicated with the combustion chamber 20.

An air cleaner 26 is installed near the entrance of the intake passage 22. There are installed inside the air cleaner 26, an air filter 26a for filtering the air taken into the intake passage 22 and an evaporative fuel adsorbent 26b having a function of adsorbing evaporative fuel in the order from the upstream side. The evaporative fuel adsorbent 26b can prevent evaporative fuel from being released into the atmosphere from the entrance of the intake passage 22 at the time of a stop of the internal combustion engine 10 or a valve stop described below.

An air flow meter 28 is installed near the downstream side of the air cleaner 26 to output a signal representing the flow rate of the air taken into the intake passage 22. A throttle valve 30 is installed downstream of the air flow meter 28. The throttle valve 30 is an electronically controlled throttle valve that can control an open position of the throttle valve independently of an open position of an accelerator.

The intake passage 22 at the downstream side of the throttle valve 30 is configured as an intake manifold 22a which has a portion branching out toward an intake port of each cylinder. A fuel injection valve 32 to inject fuel into each intake port is disposed at the intake manifold 22a of each cylinder after branching out. Moreover, at the downstream side of the throttle valve 30 in the intake passage 22 (more specifically, the integral part of the intake manifold 22a), an HC concentration sensor 34 is installed to detect a HC concentration in the gas flowing therein.

Intake valves 36 and exhaust valves 38 are provided at the intake port and an exhaust port, respectively. The intake valves 36 establish continuity or discontinuity between the combustion chamber 20 and the intake passage 22, and the exhaust valves 38 establish continuity or discontinuity between the combustion chamber 20 and the exhaust passage 24. The intake valves 36 and the exhaust valves 38 are driven by an intake variable valve operating mechanism 40 and an exhaust variable valve operating mechanism 42, respectively. Mechanisms that are capable of stopping the intake valves 36 and the exhaust valves 38 in a closed state are used as these variable valve operating apparatuses 40 and 42. Although the detailed configurations of the variable valve operating apparatuses 40 and 42 are omitted herein, for example, electromagnetically-driven type variable valve operating mechanisms that drive the intake valves 36 and the exhaust valves 38 by use of electromagnetic force can be used.

Moreover, as shown in FIG. 1, the internal combustion engine 10 is provided with a head cover 44 to cover a cylinder head. The inside of the head cover 44 and the inside of the crankcase 18 are supposed to be communicated with each other via a blow-by gas passage which is not shown. Further, the inside of the head cover 44 is communicated with the intake passage 22 at the upstream side of the throttle valve 30 via a fresh air introduction passage 46. Furthermore, the inside of the head cover 44 is communicated with the intake passage 22 at the downstream side of the throttle valve 30 via a breather passage 48. At some point of the breather passage 48, a PCV (Positive Crankcase Ventilation) valve 50 is installed. The PCV valve 50 is configured as a differential pressure actuated valve being actuated in response to a differential pressure between the inside of the head cover 44 which is positioned upstream thereof and a downstream side portion of the throttle valve 30 in the intake passage 22 which is positioned downstream thereof. According to such PCV valve 50, an arrangement is made such that the flow rate of blow-by gas flowing back into intake gas through the breather passage 48 is autonomously adjusted in accordance with the differential pressure. A positive crankcase ventilation system 52 is configured by the blow-by gas passage, the fresh air introduction passage 46, the breather passage 48 and the PCV valve 50 described above.

Moreover, the internal combustion engine 10 is provided with an evaporative fuel treatment apparatus 54 to prevent evaporative fuel from being released into the atmosphere from a fuel system (especially, a fuel tank). The evaporative fuel treatment apparatus 54 includes a canister 56 which adsorbs the evaporative fuel flowing thereinto from the fuel tank. A purge passage 58 is communicated with the canister 56. At some point of the purge passage 58, a flow rate control valve (VSV) 60 is provided, and, at an end thereof, is communicated with the intake passage 22 at the downstream side of the throttle valve 30. Such configuration makes it possible to adsorb the evaporative fuel from the fuel system to the canister 56 and purge the evaporative fuel into the intake passage 22 via the purge passage 58, the opening and closing of which is controlled by the flow rate control valve 60.

Moreover, at some point of the exhaust passage 24 (more specifically, a portion where exhaust gases from each cylinder are joined together), a catalyst 62 is disposed to purify the exhaust gases. Further, an A/F sensor 64 and an O2 sensor 66 are disposed upstream and downstream of the catalyst 62 in the exhaust passage 24, respectively. The A/F sensor 64 is a sensor that issues an output generally linear with respect to the air fuel ratio of the exhaust gas flowing into the catalyst 62, and the O2 sensor 66 is a sensor that issues a rich output when the exhaust gas flowing out from the catalyst 62 is rich with respect to the stoichiometric air fuel ratio and issues a lean output when the exhaust gas is lean.

The system shown in FIG. 1 includes an ECU (Electronic Control Unit) 70. There are connected to the input of the ECU 70, various types of sensors for detecting an operating state of the internal combustion engine 10, such as a crank angle sensor 72 for detecting an engine speed, a water temperature sensor 74 for detecting an engine cooling water temperature, and an oil temperature sensor 76 for detecting an engine oil temperature, as well as the air flow meter 28, the HC concentration sensor 34, the A/F sensor 64 and the O2 sensor 66 described above. Moreover, there are connected to the output of the ECU 70, various types of actuators for controlling the operating state of the internal combustion engine 10, as well as the throttle valve 30, the fuel injection valve 32, the variable valve operating mechanisms 40 and 42, and the flow rate control valve 60 described above. The ECU 70 can control the operation state of the internal combustion engine 10 based on those sensor outputs.

The gas blown from the combustion chamber 20 side to the crankcase 18 side via a gap between the cylinder and the piston 12 (that is, the blow-by gas) is contained in oil within the crankcase 18. During the normal operation of the internal combustion engine 10 after the completion of warm-up, fuel evaporates from the oil in a high temperature state, and comes to be introduced inside the head cover 44 via the blow-by gas passage described above. The above-described positive crankcase ventilation system allows the blow-by gas accumulated inside the head cover 44 to flow back into the intake gas by effects of the differential pressure between the inside of the head cover 44 which has reached the atmospheric air pressure due to the introduction of outdoor air via the fresh air introduction passage 46 and the downstream side portion of the throttle valve 30 under negative pressure, thereby ventilating the inside of the head cover 44.

[Characteristic Control of First Embodiment]

Meanwhile, in the present embodiment, in order to suppress the deterioration of the catalyst 62, an arrangement is made such that a control which stops the operation of the intake and exhaust valves 36 and 38 in the closed state (hereinafter, "valve stop control") is executed while fuel is being cut off at the time of deceleration or the like. During such valve stop control, the oil in the crankcase 18 is being agitated because cranking is being performed although air is not supplied into the cylinder. As a result of this, because the temperature of the oil is not dropped sharply in a moment even if the fuel cut accompanied by the valve stop is performed, the blow-by gas (unburned gas) is produced at the same incidence rate as that at normal operation.

Moreover, if the valve stop control is performed, intake negative pressure at the downstream side of the throttle valve 30 is lost. As a result of this, the differential pressure between the upstream side portion and the downstream side portion of the throttle valve 30 in the intake passage 22 gradually becomes smaller. Into the fresh air introduction passage 46 of the positive crankcase ventilation system 52, fresh air is introduced by the effect of the differential pressure. Because of this, if the differential pressure becomes small, the quantity of the fresh air supplied inside the head cover 44 becomes smaller and the blow-by gas is accumulated inside the head cover 44 without being suctioned into the cylinder. Consequently, the blow-by gas eventually flows back to the upstream side of the throttle valve 30 from the fresh air introduction passage 46. If a large quantity of the blow-by gas flowing out to the intake passage 22 through the fresh air introduction passage 46 in this way flows into the cylinders at the time of a return from the fuel cut accompanied by a valve return, a variation in air fuel ratio and a deterioration of combustion associated with it are caused. Note that in the present description, the time of the return from the fuel cut accompanied by the valve return may be simply abbreviated as the "time of the return".

More specifically, if the presence of the blow-by gas at the time of the return is not considered with respect to the control of the fuel injection amount, the output of the A/F sensor 64 becomes rich due to a great amount of the blow-by gas (HC) flowing into the cylinders at the time of the return. According to a feedback control of air fuel ratio, which corrects the fuel injection amount so that the air fuel ratio of the exhaust gas becomes the stoichiometric air fuel ratio using the sensors 64 and 66, a correction of the air fuel ratio to the lean side is performed in response to such a rich output at an early period in the beginning of the return. Then, if the blow-by gas which is remaining in the intake passage 22 is all scavenged after that, the air fuel ratio expected to have been corrected to the stoichiometric air fuel ratio by the lean correction comes to be deviated to the lean side. Therefore, it becomes hard to properly perform the air fuel ratio control at the time of the return, and thereby combustion is deteriorated.

Accordingly, in the present embodiment, an arrangement is made such that at the time of the return (the time of restart of the fuel injection), a deviation amount $\Delta A/F$ of the actual air fuel ratio (the value which is obtained based on the output of the A/F sensor 64) with respect to a target air fuel ratio of the exhaust gas is stored as an A/F learned value. On that basis, an arrangement is made such that a correction to decrease the fuel injection amount by a fuel amount equivalent to the deviation amount $\Delta A/F$ is performed at the time of the subsequent returns. In other words, a correction to decrease the fuel injection amount is performed so as to counteract the deviation amount $\Delta A/F$. In addition, in the present embodiment, an arrangement is made such that the A/F learned value is obtained in every return and then corrected to be updated to a newer value.

Figure 2:
FIG. 2 is a schematic diagram for a map storing an A/F learned value used in the first embodiment of the present invention.

FIG. 2 is a schematic diagram for a map storing the A/F learned value.

As shown in FIG. 2, the above-described A/F learned value (the deviation amount $\Delta A/F$ of the air fuel ratio) is arranged to be stored in association with a valve stop time at obtaining the deviation amount $\Delta A/F$ (that is, an execution time of the valve stop control). Moreover, the A/F learned value is arranged to be stored in association with the engine water temperature at obtaining the deviation amount $\Delta A/F$.

Moreover, in the present embodiment, an arrangement is made so as to gradually decrease the decrease correction amount of the fuel injection amount calculated as described above in accordance with a total intake air amount after the valve return. On that basis, in the present embodiment, the decrease correction amount is decreased to zero at the timing when the total intake air amount becomes equal to an air amount for filling inner volume of the intake passage 22.

Further, in the present embodiment, an arrangement is made such that execution of a purge control for evaporative fuel by use of the above-described evaporative fuel treatment apparatus 54 is prohibited until the decrease correction amount becomes zero from the beginning of the return.

Furthermore, in the present embodiment, when the valve stop time is reached to a defined value (upper limit) X predefined in accordance with a adsorption capacity of the evaporative fuel adsorbent 26b, the valve stop control is discontinued even if a valve return request (a return request from the fuel cut) is not issued yet.

Figure 3:
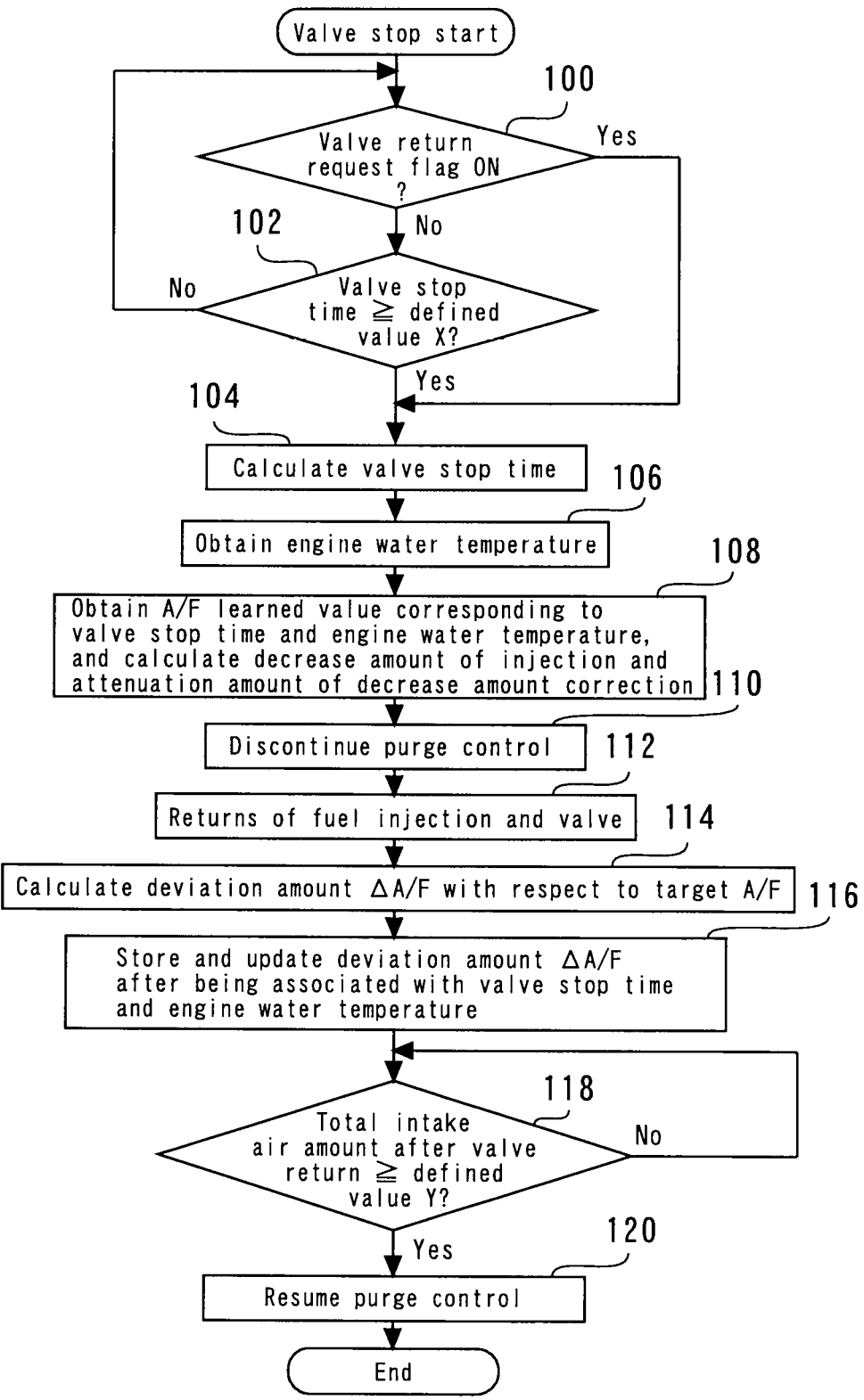
FIG. 3 is a flowchart illustrating a routine that is executed according to the first embodiment of the present invention.

FIG. 3 is a flowchart of the routine to be executed by the ECU 70 in the present first embodiment to implement the above-described each function. Note that the present routine is supposed to start up after the start of the valve stop control.

In the routine shown in FIG. 3, it is first determined whether or not a valve return request flag is in the ON state (step 100). The valve return request flag is set to ON when a predetermined fuel cut return condition is established.

If it is determined in step 100 that the valve return request flag is not in the ON state, it is next determined whether or not a valve stop time at the current valve stop control is equal to or longer than the defined value X (step 102). As described above, the defined value X in present step 102 is a predefined value in accordance with the adsorption capacity of the evaporative fuel adsorbent 26b. When the fuel cut accompanied by the valve stop is executed, the blow-by gas is accumulated inside the head cover 44 with the passage of the valve stop time. If the inside of the head cover 44 is then filled up, the intake passage 22 communicated with the fresh air introduction passage 46 is filled with the blow-by gas, and a part of the blow-by gas is adsorbed by the evaporative fuel adsorbent 26b. The above-mentioned defined value X is a preset value as a time period required for an amount of the blow-by gas adsorbing on the evaporative fuel adsorbent 26b, to be reached to the adsorption capacity of the adsorbent 26b at the time of the valve stop control.

While it is determined in above step 102 that the valve stop time is still not reached to the defined value X, it returns to above step 100 to continue the valve stop control only if the valve return request flag is not in the ON state. On the other hand, if it is determined in above step 100 that the valve return request flag is in the ON state, or if it is determined in above step 102 that the valve stop time becomes equal to or longer than the defined X, the valve stop time at the present moment is calculated (step 104) and the current engine water temperature is obtained (step 106).

Next, the A/F learned value corresponding to the valve stop time and the engine water temperature obtained in above steps 104 and 106 is obtained (step 108). In present step 108, based on the A/F learned value, the decrease correction amount of the fuel injection amount at the time of the return is calculated and an attenuation amount of the decrease correction amount with respect to the total intake air amount after the valve return is calculated.

More specifically, in present step 108, the A/F learned value is obtained with reference to a map similar to the one shown in above-described FIG. 2. The A/F learned value is the above-described deviation amount $\Delta A/F$ of the air fuel ratio due to the fact that the blow-by gas remaining in the intake passage 22 during the valve stop flows into the cylinders at the time of the return from the fuel cut accompanied by the valve return. In present step 108, the decrease correction amount is calculated so that the fuel injection amount is decreased by a fuel amount equivalent to this A/F learned value (that is, the deviation amount $\Delta A/F$). Then, the attenuation amount of the decrease correction amount is calculated so as to be finally zero at a timing when it is gradually decreased in accordance with the total intake air amount after the valve return and the total intake air amount becomes equal to an air amount which coincides with the inner volume of the intake passage 22.

Next, the purge control for the evaporative fuel by use of the above-described evaporative fuel treatment apparatus 54 is discontinued (step 110). More specifically, the flow rate control valve 60 is closed to discontinue the supply of purge gas containing the evaporative fuel into the intake passage 22. Then, the return of the fuel injection and the return of the operation of the intake and exhaust valves 36 and 38 are executed respectively (step 112).

Next, the deviation amount $\Delta A/F$ of the actual air fuel ratio at the time of current return with respect to a target air fuel ratio of the exhaust gas (for example, the stoichiometric air fuel ratio) is calculated (step 114). Then, the deviation amount $\Delta A/F$ of the air fuel ratio calculated currently is stored and updated as the A/F learned value after being associated with the current valve stop time and engine cooling water temperature (step 116).

Next, it is determined whether or not the total intake air amount after the valve return becomes equal to or larger than a defined value Y (step 118). The defined value Y in present step 118 is a preset value as a value that is equal to an air amount which coincides with the inner volume of the intake passage 22. If it is determined in present step 118 that the total intake air amount after the valve return becomes equal to or larger than the above-described defined value Y, that is to say, it can be judged that the blow-by gas remaining inside the intake passage 22 is scavenged by the fresh air newly taken into the intake passage 22, the purge control for the evaporative fuel by use of the evaporative fuel treatment apparatus 54 is resumed (step 120).

According to the routine shown in FIG. 3 described so far, the correction to decrease the fuel injection amount at the time of the subsequent returns is performed in accordance with the deviation amount $\Delta A/F$ of the air fuel ratio (A/F learned value) obtained at the time of the return. This makes it possible to adequately determine the fuel injection amount at the time of the return, while taking into consideration effects of the blow-by gas remaining inside the intake passage 22 during the valve stop. Because of this, it is possible to successfully suppress the deterioration of combustion due to the blow-by gas at the time of the return.

Moreover, the above-described deviation amount $\Delta A/F$ of the air fuel ratio increases as the amount of the blow-by gas remaining inside the intake passage 22 during the valve stop increases. Because of this, by obtaining the deviation amount $\Delta A/F$ at the time of the return, it becomes possible to successfully estimate the concentration of the blow-by gas (that is, the HC concentration) within the intake passage 22 at the time of the return using the A/F sensor 64 installed in the exhaust passage 24 originally for the air fuel ratio control.

Moreover, according to the routine, the A/F learned value (the deviation amount $\Delta A/F$) associated with the valve stop time is stored. The amount of the blow-by gas flowing out the intake passage 22 during the valve stop varies with the valve stop time. Thus, by storing and learning the A/F learned value associated with the valve stop time, the decrease correction amount of the fuel injection amount required for immediately achieving a desired air fuel ratio at the time of the subsequent returns can be obtained more accurately in accordance with the valve stop time of the moment.

Moreover, according to the routine, the A/F learned value (the deviation amount $\Delta A/F$) associated with the engine water temperature as well as the valve stop time is stored. The amount of the blow-by gas arising during the valve stop varies with a warming state of the internal combustion engine 10. Thus, by storing and learning the A/F learned value associated with the engine water temperature, the decrease correction amount of the fuel injection amount required for immediately achieving a desired air fuel ratio at the time of the subsequent returns can be obtained more accurately in accordance with the engine water temperature of the moment.

Moreover, according to the routine, the attenuation amount of the decrease correction amount is set so as to be finally zero at a timing when it is gradually decreased in accordance with the total intake air amount after the valve return and the total intake air amount becomes equal to an air amount which coincides with the inner volume of the intake passage 22. This makes it possible to adequately set the decrease correction amount of the fuel injection amount in accordance with conditions of the scavenge of the blow-by gas within the intake passage 22 after the valve return.

Moreover, according to the routine, at the time of the return, the purge control for the evaporative fuel by use of the evaporative fuel treatment apparatus 54 is discontinued during a time period until it is determined that the total intake air amount after the valve return becomes equal to or larger than the defined value Y, that is to say, a time period during which the decrease correction of the fuel injection amount is being performed. Originally, such purge control itself is constantly performed if the internal combustion engine 10 is normally operated after the completion of the warming. However, if the purge control is executed during the time period during which the decrease correction of the fuel injection amount is being done after the return, the purge gas containing the evaporative fuel (HC) from the evaporative fuel treatment apparatus 54 will affect the deviation amount $\Delta A/F$ of the air fuel ratio. In contrary to this, discontinuing the purge control as described above can prevent an incorrect A/F learned value from being stored and learned due to the purge gas. Further, discontinuing the purge control can also avoid the blow-by gas at the return from negatively affecting the learning of the purge gas in a case in which a learning of HC concentration of the purge gas is performed by use of the output of the A/F sensor 64 as in the case of the learning of the blow-by gas at the time of the return in the present embodiment. In this way, it is possible to prevent the learning of the blow-by gas from being confounded with the learning of the purge gas.

Furthermore, according to the routine, if it is determined that the valve stop time becomes equal to or longer than the defined value X preset in accordance with the adsorption capacity of the evaporative fuel adsorbent 26b, the valve stop is discontinued even if the valve return request is still not issued. This makes it possible to prevent the blow-by gas being accumulated in the intake passage 22 during the valve stop from being released to the atmosphere from the entrance side of the intake passage 22.

Meanwhile, in the first embodiment, which has been described above, the description is made on an example in which both operations of the intake and exhaust valves 36 and 38 are stopped in the closed state at the time of the valve stop control that is performed for avoidance of the supply of the fresh air to the catalyst 62. However, the valve to be stopped in the closed state in the present invention may be either one of the intake valve and the exhaust valve.

Moreover, in the first embodiment, which has been described above, the arrangement is made such that the A/F learned value (the deviation amount $\Delta A/F$ of the air fuel ratio) equivalent to an HC concentration information in the present invention is stored associated with the valve stop time at obtaining the deviation amount $\Delta A/F$. As already described, the amount of the blow-by gas flowing out into the intake passage 22 during the valve stop varies with the elapsed time after the start of the valve stop. In the present invention, the parameter targeted for the association when storing the HC concentration information within the intake passage in order to take into consideration the change of such blow-by gas amount, is not limited to the valve stop time and may be, for example, a total engine speed after the start of the valve stop.

Moreover, in the first embodiment, which has been described above, the arrangement is made such that the A/F learned value (the deviation amount $\Delta A/F$ of the air fuel ratio) equivalent to the HC concentration information in the present invention is stored associated with the engine water temperature at obtaining the deviation amount $\Delta A/F$. As already described, the amount of the blow-by gas arising during the valve stop varies with the warming state of the internal combustion engine 10. In the present invention, the parameter targeted for the association when storing the HC concentration information within the intake passage in order to take into consideration the change of such arising amount of the blow-by gas, is not limited to the engine water temperature and may be, for example, an engine oil temperature.

Moreover, in the first embodiment, which has been described above, if it is determined that the valve stop time becomes equal to or longer than the defined value X preset in accordance with the adsorption capacity of the evaporative fuel adsorbent 26b, the valve stop is discontinued even if the valve return request is still not issued. However, in the present invention, whether or not it is necessary to discontinue the valve stop may be judged by comparison between a total engine speed after the start of the valve stop and a defined value that is set based on the same idea as the above-described defined value X, instead of the method of comparing the valve stop time with the defined value X.

Furthermore, in the first embodiment, which has been described above, the arrangement is made such that the evaporative fuel adsorbent 26b is provided in the air cleaner 26 disposed near the entrance of the intake passage 22. However, the alignment portion of the evaporative fuel adsorbent in the present invention is not limited this, and may be the intake passage at the upstream side of the connecting portion to the intake passage in the fresh air introduction passage that is included in the positive crankcase ventilation system.

Note that in the first embodiment, which has been described above, the "valve stop execution means" according to the above-described first aspect of the present invention, the "HC concentration estimation means" according to the above-described first aspect of the present invention, and the "injection amount determination means" according to the above-described first aspect of the present invention are implemented by the ECU 70 stopping the operation of the intake and exhaust valves 36 and 38 in the closed state by use of the variable valve operating mechanisms 40 and 42 at the time of the fuel cut, executing the processing of above-described step 116, and executing the processing of above-described step 108, respectively.

In addition, in the first embodiment, which has been described above, the A/F sensor 64 corresponds to the "air fuel ratio sensor" according to the above-described second aspect of the present invention.

Further in the first embodiment, which has been described above, the "HC concentration storage means" according to the above-described fifth aspect of the present invention is implemented by the ECU 70 executing the processing of above-described step 116.

Furthermore in the first embodiment, which has been described above, the "purge control prohibition means" according to the above-described sixth aspect of the present invention is implemented by the ECU 70 executing the processing of above-described step 110.

Furthermore in the first embodiment, which has been described above, the "valve stop time determination means" according to the above-described seventh aspect of the present invention is implemented by the ECU 70 executing the processing of above-described step 112 to release the valve stop when the determination of the above-described step 102 is positive.

Second Embodiment

Next, a second embodiment of the present invention will be described with reference to FIG. 4.

The system of the present embodiment can be implemented by using the hardware configuration shown in FIG. 1 and causing the ECU 70 to execute the routine shown in FIG. 4 described below instead of the routine shown in FIG. 3.

In the first embodiment described above, the arrangement is made such that the HC concentration inside the intake passage 22 is estimated based on the deviation amount ΔA/F of the air fuel ratio at the time of the return from the fuel cut accompanied by the valve return and that the fuel injection amount at the time of the subsequent returns is determined in accordance with the HC concentration. In contrary to this, in the present embodiment, an arrangement is made such that the HC concentration inside the intake passage 22 during the valve stop (that is, the concentration of the blow-by gas) is measured by use of the HC concentration sensor 34 installed in the intake passage 22 and that the HC concentration inside the intake passage 22 at the time of the return with respect to the current valve stop is estimated. On that basis, an arrangement is made such that the decrease correction amount of the fuel injection amount at the return is calculated in accordance with the estimated HC concentration.

Moreover, in the present embodiment as well, as in the first embodiment, the deviation amount ΔA/F of the actual air fuel ratio with respect to the target air fuel ratio is obtained by the A/F sensor 64 at the time of each of the return. On that basis, in the present embodiment, an arrangement is made such that it is determined whether or not the HC concentration sensor 34 is abnormal in accordance with whether or not the deviation amount ΔA/F is within a defined value Z as a result of adjusting the fuel injection amount based on the HC concentration using the HC concentration sensor 34 as described above.

Furthermore, in the present embodiment, an arrangement is made such that the deviation of the output of the HC concentration sensor is corrected using the deviation amount ΔA/F.

FIG. 4 is a flowchart of the routine to be executed by the ECU 70 in the present second embodiment to implement the above-described each function. Note that in FIG. 4, the same steps as those in FIG. 3 in the first embodiment will be assigned with the same reference numerals and the descriptions therefor will be omitted or simplified.

In the routine shown in FIG. 4, if it is determined in step 100 that the valve return request flag is in the ON state, the HC concentration inside the intake passage 22 is detected by use of the HC concentration sensor 34 at a timing immediately before the valve return (step 200).

Next, the decrease correction amount of the fuel injection amount is calculated based on the detected HC concentration and the target air fuel ratio (step 202). More specifically, the air fuel ratio of the gas inside the intake passage 22 can be calculated in accordance with predetermined reduction formulae if the HC concentration inside the intake passage 22 is revealed by the HC concentration sensor 34. If effects of the blow-by gas are taken into consideration with respect to the fuel injection amount, a deviation in accordance with the air fuel ratio of the gas inside the intake passage 22 is included in the actual air fuel ratio of the exhaust gas immediately after the return. Accordingly, based on the above HC concentration and the target air fuel ratio, the decrease correction amount of the fuel injection amount is calculated in present step 202 so as to be decreased by a fuel amount equivalent to the deviation amount ΔA/F with respect to the target air fuel ratio of the exhaust air fuel ratio expected in accordance with the HC concentration. In addition, in present step 202, the attenuation amount of the decrease correction amount with respect to the total intake air amount after the valve return is calculated.

Next, in the routine shown in FIG. 4, after the discontinuation of the purge control for the evaporative fuel (step 110), the returns of the fuel injection and the valve operation (step 112), and the calculation of the deviation amount ΔA/F based on the output of the A/F sensor 64 (step 114) are performed, it is determined whether or not the learning of the A/F sensor 64 has been completed (step 204).

The output characteristics of the A/F sensor 64 vary with factors such as individual variability of the sensor and temporal change, and thereby a deviation of the correspondence relation between the actual air fuel ratio and the sensor output may be produced. In the present embodiment, the learning of the deviation which the A/F sensor 64 has is separately performed using the output of the O2 sensor 66 disposed at the downstream side of the A/F sensor 64. In present step 204, it is determined whether or not such learning of the A/F sensor 64 is in a completed state, that is to say, whether or not the A/F sensor 64 is in a state in which an adequately accurate actual air fuel ratio can be outputted.

If it is judged in above step 204 that the learning of the A/F sensor 64 has not been completed, an abnormality determination processing and a correction processing for output deviation of the HC concentration sensor 34 by the following steps 206 to 212 are both skipped. If, on the other hand, it is determined that the learning of the A/F sensor 64 has been completed, it is determined whether or not the deviation amount ΔA/F of the air fuel ratio obtained in above step 114 is within a defined value Z (step 206).

The deviation amount ΔA/F of the air fuel ratio obtained in above step 114 is a value at the time of the return accompanied by the decrease correction in above step 202 in accordance with the HC concentration. Thus, provided that the HC concentration sensor 34 outputs the right HC concentration, by performing a pertinent decrease correction, the actual air fuel ratio of the exhaust gas is not deviated widely with respect to the target air fuel ratio. The defined value Z in present step 206 is previously set as a threshold value of the deviation amount ΔA/F for judging whether or not the output of the HC concentration sensor 34 is abnormal.

If it is determined in above step 206 that the deviation amount ΔA/F is within the defined value Z, it can be judged that the deviation amount ΔA/F is suppressed small as a result of the decreased correction based on the HC concentration being performed, and thus it is determined that the HC concentration sensor 34 is normal (step 208).

Next, the correction of the output deviation of the HC concentration sensor 34 based on the deviation amount ΔA/F is executed as needed (step 210). More specifically, a deviation due to individual variability, temporal change or the like may be included in the output of the HC concentration sensor 34, even if the output of the HC concentration sensor 34 has reached a level that can be judged to be normal. The deviation amount ΔA/F is a value after the decrease correction of the fuel injection in accordance with the HC concentration by the HC concentration sensor 34. Accordingly, in present step 210, a correction amount of the output of the HC concentration sensor 34 required for reducing the deviation amount ΔA/F to zero is calculated, and the output is corrected based on the correction amount.

If, on the other hand, it is determined in above step 206 that the deviation amount ΔA/F is not within the defined value Z, the deviation amount ΔA/F is large even though the decrease correction based on the HC concentration has been executed, and thus it is determined that abnormality is occurred to the HC concentration sensor 34 (step 212).

In the routine shown in FIG. 4, if it is determined that the total intake air amount after the valve return has become equal to or larger than the defined value Y (step 118) after the processing of above steps 210 and 212 are executed, the purge control for the evaporative fuel by use of the above-described evaporative fuel treatment apparatus 54 is resumed (step 120).

According to the routine shown in FIG. 4 described so far, the correction to decrease the fuel injection at the time of the return from the valve stop is performed in accordance with the HC concentration inside the intake passage 22 obtained during the valve stop immediately before the return. This makes it possible to adequately determine the fuel injection amount at the time of the return from the valve stop, while taking into consideration effects of the blow-by gas remaining inside the intake passage 22 during the valve stop. According to such method of the present embodiment, at the time of the return, it is also possible to successfully suppress the deterioration of combustion due to the blow-by gas.

Moreover, according to the routine described above, abnormality determination for the HC concentration sensor 34 can be performed based on the deviation amount ΔA/F of the air fuel ratio obtained by use of the output of the A/F sensor 64, the learning of which has been completed. This makes it possible to perform the abnormality determination for the HC concentration sensor 34 through the use of the existing A/F sensor 64 without adding a new sensor and the like separately.

Furthermore, according to the above-described routine, even if the HC concentration sensor 34 includes an output deviation, it becomes possible to correct such an output deviation based on the deviation amount ΔA/F of the air fuel ratio obtained by use of the output of the A/F sensor 64, the learning of which has been completed, without adding a new sensor and the like separately.

Meanwhile, in the second embodiment, which has been described above, the HC concentration inside the intake passage 22 at the time of the return is estimated based on the output of the HC concentration sensor 34 installed in the intake passage 22. However, the HC concentration detection means in the present invention is not limited to such HC concentration sensor 34 and may be, for example, an A/F sensor similar to the A/F sensor 64 installed in the exhaust passage 24.

Note that in the second embodiment, which has been described above, the "HC concentration estimation means" according to the above-described first aspect of the present invention, and the "injection amount determination means" according to the above-described first aspect of the present invention are implemented by the ECU 70 executing the processing of above-described step 200, and the processing of above-described step 202, respectively.

In addition, in the second embodiment, which has been described above, the HC concentration sensor 34 corresponds to the "HC concentration detection means" according to the above-described third aspect of the present invention.

In addition, in the second embodiment, which has been described above, the A/F sensor 64 corresponds to the "air fuel ratio sensor" according to the above-described fourth aspect of the present invention, and the "sensor abnormality determination means" according to the above-described fourth aspect of the present invention is implemented executing the processing of above-described steps 204 to 208 and 212.

The invention claimed is:

1. A control apparatus for an internal combustion engine including a variable valve operating mechanism, the control apparatus comprising:
   a positive crankcase ventilation system which circulates blow-by gas inside the internal combustion engine back into intake air to treat the blow-by gas;
   a variable valve operating mechanism which is capable of stopping operation of at least one valve of an intake valve and an exhaust valve in a closed state;
   valve stop execution means which stops the at least one valve in the closed state when a fuel cut of the internal combustion engine is executed;
   HC concentration estimation means which estimates an HC concentration of gas inside an intake passage at the time of a valve return when the at least one valve returns to a operable state from a stop state; and
   injection amount determination means which determines a fuel injection amount at the time of the valve return based on the HC concentration estimated by the HC concentration estimation means.

2. The control apparatus for an internal combustion engine including a variable valve operating mechanism according to claim 1,
   wherein the control apparatus for the internal combustion engine further comprises an air fuel ratio sensor which detects an air fuel ratio of exhaust gas flowing through an exhaust passage, and
   wherein the HC concentration estimation means estimates the HC concentration of gas inside the intake passage at the time of the valve return, based on a deviation between a predetermined target air fuel ratio and an actual air fuel ratio detected by the air fuel ratio sensor at the time of the valve return.

3. The control apparatus for an internal combustion engine including a variable valve operating mechanism according to claim 1,
   wherein the HC concentration estimation means includes HC concentration detection means which is disposed at the intake passage, and
   wherein the HC concentration estimation means estimates the HC concentration of gas inside the intake passage at the time of the valve return using a value detected by the HC concentration detection means.

4. The control apparatus for an internal combustion engine including a variable valve operating mechanism according to claim 3,
   wherein the control apparatus for the internal combustion engine further comprises:
   an air fuel ratio sensor which detects an air fuel ratio of exhaust gas flowing through an exhaust passage; and
   sensor abnormality determination means which determines that the HC concentration detection means is abnormal when a deviation between a predetermined target air fuel ratio and an actual air fuel ratio detected by the air fuel ratio sensor at the time of the valve return is equal to or larger than a predetermined value.

5. The control apparatus for an internal combustion engine including a variable valve operating mechanism according to claim 1,
   wherein the injection amount determination means includes HC concentration storage means which stores, in association with a valve stop time or a total engine speed during the valve stop, the HC concentration estimated by the HC concentration estimation means, and
   wherein the injection amount determination means determines the fuel injection amount at the time of the valve stop based on the HC concentration stored by the HC concentration storage means.

6. The control apparatus for an internal combustion engine including a variable valve operating mechanism according to claim 5, wherein the internal combustion engine further comprises an evaporative fuel treatment apparatus which causes a canister to adsorb evaporative fuel from a fuel system and allows the evaporative fuel adsorbed by the canister to be purged into the intake passage via a purge passage having a flow rate control valve, and wherein the control apparatus for the internal combustion engine further comprises purge control prohibition means which prohibits a supply of purge gas into the intake passage by the evaporative fuel treatment apparatus when a fuel injection amount control is executed by the injection amount determination means based on the HC concentration in the intake passage.

7. The control apparatus for an internal combustion engine including a variable valve operating mechanism according to claim 1, wherein the internal combustion engine further comprises an evaporative fuel adsorbent which adsorbs evaporative fuel at the intake passage at an upstream side of a connecting portion to the intake passage in a fresh air introduction passage that is included in the positive crankcase ventilation system, and wherein the control apparatus for the internal combustion engine further comprises valve stop time determination means which determines a valve stop time in accordance with an adsorption amount of the evaporative fuel onto the evaporative fuel adsorbent.

8. A control apparatus for an internal combustion engine including a variable valve operating mechanism, the control apparatus comprising:

a positive crankcase ventilation system which circulates blow-by gas inside the internal combustion engine back into intake air to treat the blow-by gas;

a variable valve operating mechanism which is capable of stopping operation of at least one valve of an intake valve and an exhaust valve in a closed state;

a valve stop execution unit which stops the at least one valve in the closed state when a fuel cut of the internal combustion engine is executed;

an HC concentration estimation unit which estimates an HC concentration of gas inside an intake passage at the time of a valve return when the at least one valve returns to a operable state from a stop state; and an injection amount determination unit which determines a fuel injection amount at the time of the valve return based on the HC concentration estimated by the HC concentration estimation unit.

* * * * *